United States Patent
Nakai

(10) Patent No.: US 10,482,847 B2
(45) Date of Patent: Nov. 19, 2019

(54) DRIVING METHOD AND DRIVING APPARATUS FOR DISPLAY PANEL, AND DISPLAY DEVICE

(71) Applicant: BOE Technology Group Co., Ltd., Beijing (CN)

(72) Inventor: Tadashi Nakai, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 178 days.

(21) Appl. No.: 15/302,042

(22) PCT Filed: Oct. 30, 2015

(86) PCT No.: PCT/CN2015/093391
§ 371 (c)(1),
(2) Date: Oct. 5, 2016

(87) PCT Pub. No.: WO2016/184039
PCT Pub. Date: Nov. 24, 2016

(65) Prior Publication Data
US 2017/0243566 A1 Aug. 24, 2017

(30) Foreign Application Priority Data
May 21, 2015 (CN) .......................... 2015 1 0263265

(51) Int. Cl.
*G09G 5/02* (2006.01)
*G09G 5/373* (2006.01)
(Continued)

(52) U.S. Cl.
CPC ............. *G09G 5/373* (2013.01); *G09G 5/005* (2013.01); *G09G 5/02* (2013.01); *G09G 5/04* (2013.01);
(Continued)

(58) Field of Classification Search
CPC .. G09G 5/373; G09G 5/02; G09G 2320/0666; G09G 2340/0407; G09G 3/36;
(Continued)

(56) References Cited

U.S. PATENT DOCUMENTS 4,857,992 A * 8/1989 Richards ................ H04N 1/217
375/240.01
4,984,081 A 1/1991 Miyoshi et al.
(Continued)

FOREIGN PATENT DOCUMENTS

CN 1744723 A 3/2006
CN 102118624 A 7/2011
(Continued)

OTHER PUBLICATIONS

Feb. 26, 2016—(WO) International Search Report and Written Opinion Appn PCT/CN2015/093391 with English Tran.
(Continued)

*Primary Examiner* — Trang U Tran
(74) *Attorney, Agent, or Firm* — Banner & Witcoff, Ltd.

(57) ABSTRACT

An driving method for a display panel, the display panel having a first resolution. The driving method comprises: converting RGB signals of an input image having a second resolution into YUV signals corresponding to an output image, a resolution of the output image being not smaller than the second resolution; converting the YUV signals into RGB signals corresponding to the output image; converting the RGB signals corresponding to the output image into driving signals for driving the display panel; and outputting the driving signals to the display panel. Display panels having the resolution of 10240×4320 can be driven by using the driving method.

17 Claims, 11 Drawing Sheets

(51) Int. Cl.
  *H04N 7/015* (2006.01)
  *G09G 5/00* (2006.01)
  *G09G 5/04* (2006.01)
  *H04N 7/01* (2006.01)
  *H04N 9/67* (2006.01)

(52) U.S. Cl.
  CPC ........... *H04N 7/015* (2013.01); *H04N 7/0125* (2013.01); *H04N 9/67* (2013.01); *G09G 2320/0276* (2013.01); *G09G 2320/0666* (2013.01); *G09G 2340/0407* (2013.01); *G09G 2340/0435* (2013.01); *G09G 2340/0442* (2013.01); *G09G 2340/06* (2013.01); *G09G 2370/12* (2013.01)

(58) Field of Classification Search
  CPC ............ H04N 9/64; H04N 9/31; H04N 9/646; H04N 9/3179
  USPC .................................. 345/604; 348/445, 624
  See application file for complete search history.

(56) References Cited

U.S. PATENT DOCUMENTS

| | | | |
|---|---|---|---|
| 7,139,022 | B1 | 11/2006 | Raffy |
| 7,664,335 | B2 * | 2/2010 | Kurumisawa ............ G09G 3/20 358/1.2 |
| 9,105,243 | B2 * | 8/2015 | Shiomi ................ G09G 3/3426 |
| 9,560,331 | B2 * | 1/2017 | Nakai ....................... G09G 3/36 |
| 9,582,852 | B2 * | 2/2017 | Wallace .................... G06T 3/40 |
| 2003/0146885 | A1 | 8/2003 | Hoppenbrouwers et al. |
| 2004/0012606 | A1 | 1/2004 | Gim |
| 2006/0274094 | A1 | 12/2006 | Chen et al. |
| 2007/0188661 | A1 * | 8/2007 | Chen ........................ H04N 1/62 348/649 |
| 2011/0037784 | A1 | 2/2011 | Shiomi |
| 2011/0205428 | A1 | 8/2011 | Yamashita |
| 2014/0307165 | A1 | 10/2014 | Chiba |
| 2015/0002739 | A1 | 1/2015 | Rui |
| 2015/0296175 | A1 | 10/2015 | Wallace et al. |

FOREIGN PATENT DOCUMENTS

| | | |
|---|---|---|
| CN | 102665029 A | 9/2012 |
| CN | 103124337 A | 5/2013 |
| CN | 103347163 A | 10/2013 |
| CN | 104052978 A | 9/2014 |
| CN | 104809977 A | 7/2015 |
| EP | 1669968 A2 | 6/2006 |
| JP | 2008165145 A | 7/2008 |
| KR | 1020080062546 A | 7/2008 |
| KR | 20130118178 A | 10/2013 |
| WO | 2013003698 A2 | 1/2013 |

OTHER PUBLICATIONS

Dec. 8, 2016—(CN) First Office Action Appn 201510263265.5 with English Tran.
May 19, 2016—(US) Office Action U.S. Appl. No. 14/600,654.
Jul. 28, 2015—(CN) First Office Action Appn 201410241104.1 with English Translation.
Oct. 26, 2015—(EP) Extended European Search Report Appn 15155973.9.
Jul. 19, 2018—(EP) Office Action Appn 15155973.9.

* cited by examiner

| 1920×1080 | 1920×1080 |
|---|---|
| 1920×1080 | 1920×1080 |

FIG. 6

| 1920×1080 | 1920×1080 | 1920×1080 | 1920×1080 |
|---|---|---|---|
| 1920×1080 | 1920×1080 | 1920×1080 | 1920×1080 |
| 1920×1080 | 1920×1080 | 1920×1080 | 1920×1080 |
| 1920×1080 | 1920×1080 | 1920×1080 | 1920×1080 |

FIG. 7

| 854×2160 | 854×2160 | 852×2160 | 854×2160 | 854×2160 | 852×2160 |
|---|---|---|---|---|---|

FIG. 8

DRIVING METHOD AND DRIVING APPARATUS FOR DISPLAY PANEL, AND DISPLAY DEVICE

The application is a U.S. National Phase Entry of International Application No. PCT/CN2015/093391 filed on Oct. 30, 2015, designating the United States of America and claiming priority to Chinese Patent Application No. 201510263265.5, which was filed on May 21, 2015. The present application claims priority to and the benefit of the above-identified applications and the above-identified applications are incorporated by reference herein in their entirety.

TECHNICAL FIELD

The present disclosure relates to the field of display technique, and more particularly, to a driving method for a display panel, a driving apparatus for executing the driving method, and a display device comprising the driving apparatus.

BACKGROUND

At present, an aspect ratio of display panels has a tendency to increase. For example, display panels having an aspect ratio of 16:9 now appear on the market. A resolution of such display panels typically is 8k4k (i.e., 7680×4320). In order to achieve displaying of a higher definition, display panels having an aspect ratio of 21:9 also appear. A resolution of such display panels can be 10k4k (i.e., 10240×4320).

An amount of data required when driving display panels having a resolution of 10k4k to display is very large, however, at present, there is no better driving method for driving display panels having a resolution of 10k4k to display.

SUMMARY

An objective of the present disclosure is to provide a driving method for a display panel, a driving apparatus for executing the driving method, and a display device comprising the driving apparatus. The driving method can implement driving of display panels having a resolution of 10k4k.

In order to achieve the above objective, as an aspect of the present disclosure, there is provided a driving method for a display panel, the display panel having a first resolution, the driving method comprising: converting RGB signals of an input image having a second resolution into YUV signals corresponding to an output image, a resolution of the output image being not smaller than the second resolution; converting the YUV signals into RGB signals corresponding to the output image; converting the RGB signals corresponding to the output image into driving signals for driving the display panel; and outputting the driving signals to the display panel.

According to an embodiment of the present disclosure, the first resolution is equal to the second resolution, converting RGB signals of an input image having a second resolution into YUV signals corresponding to an output image comprises: segmenting the input image into N sub-images, N being a positive integer; and converting RGB signals of each of the sub-images into a group of YUV signals, to obtain N groups of YUV signals.

According to an embodiment of the present disclosure, the second resolution is smaller than the first resolution, converting RGB signals of an input image having a second resolution into YUV signals corresponding to an output image comprises: converting the RGB signals of the input image into YUV signals corresponding to the input image; performing enlarging process on the YUV signals corresponding to the input image to obtain the YUV signals corresponding to the output image.

According to an embodiment of the present disclosure, segmenting the input image into N sub-images comprises: segmenting the input image into N initial sub-images, the N initial sub-images including K first initial sub-images having a third resolution and (N-K) second initial sub-images having a fourth resolution, the third resolution being smaller than the fourth resolution, K being a positive integer and smaller than N; and regarding the second initial sub-images as sub-images corresponding to the second initial sub-images, and adding blank pixels to the first initial sub-images to obtain sub-images corresponding to the first initial sub-images, an amount of the blank pixels being equal to a difference between the fourth resolution and the third resolution.

According to another aspect of the present disclosure, there is provided a driving apparatus for a display panel, the display panel having a first resolution, the driving apparatus comprising: a first signal converting module configured to convert RGB signals of an input image having a second resolution into YUV signals corresponding to an output image, a resolution of the output image being not smaller than the second resolution; a second signal converting module configured to convert the YUV signals obtained in the first signal converting module into RGB signals corresponding to the output image; a third signal converting module configured to convert the RGB signals obtained in the second signal converting module into driving signals for driving the display panel; and a signal output module configured to output the driving signals obtained in the third signal converting module to the display panel.

As yet another aspect of the present disclosure, there is provided a display device, comprising a driving apparatus and a display panel, the display panel having a first resolution, an output terminal of the driving apparatus is connected to an input terminal of the display device, wherein the driving apparatus is any of the driving apparatus described above.

Preferably, a resolution of the display panel is 10240×4320.

In the above driving method, the display panel is used to display an output image, thus a resolution of the output image may be the first resolution or may be smaller than the first resolution. In the driving method provided by the present disclosure, the first resolution and the second resolution may be the same or different.

When driving a display panel by using the driving method provided by the present disclosure, regardless whether a resolution of the input image is the same as a resolution of the display panel, driving of the display panel can be always implemented.

When the resolution of the display panel is 10240×4320, no matter how much the resolution of the input image is, driving of the display panel can be always implemented by using the driving method provided by the present disclosure.

BRIEF DESCRIPTION OF THE DRAWINGS

The accompanying drawings are to provide a further understanding of the present disclosure, and constitute a portion of the specification, they are for explaining the present disclosure together with the specific implementations provided below, and do not function as limiting the present disclosure. In the drawings:

FIG. 3 is an exemplary segmenting method for an input image having a resolution of 10240×4320 according to the first embodiment of the present disclosure;

FIG. 4 is an exemplary segmenting method for an input image having a resolution of 10240×4320 according to the first embodiment of the present disclosure;

FIG. 6 is an exemplary segmenting method for an input image having a resolution of 3840×2160 according to the second embodiment of the present disclosure;

FIG. 7 is an exemplary segmenting method for an input image having a resolution of 7860×4320 according to the second embodiment of the present disclosure;

FIG. 8 is an exemplary segmenting method for an input image having a resolution of 5120×2160 according to the second embodiment of the present disclosure;

DETAILED DESCRIPTION OF THE EMBODIMENTS

Hereinafter, the specific implementations will be described in detail with reference to the accompanying drawings, it should be understood that the specific implementations described herein are intended to describe and explain the present disclosure, rather than make limitations to the present disclosure.

Figure 1:
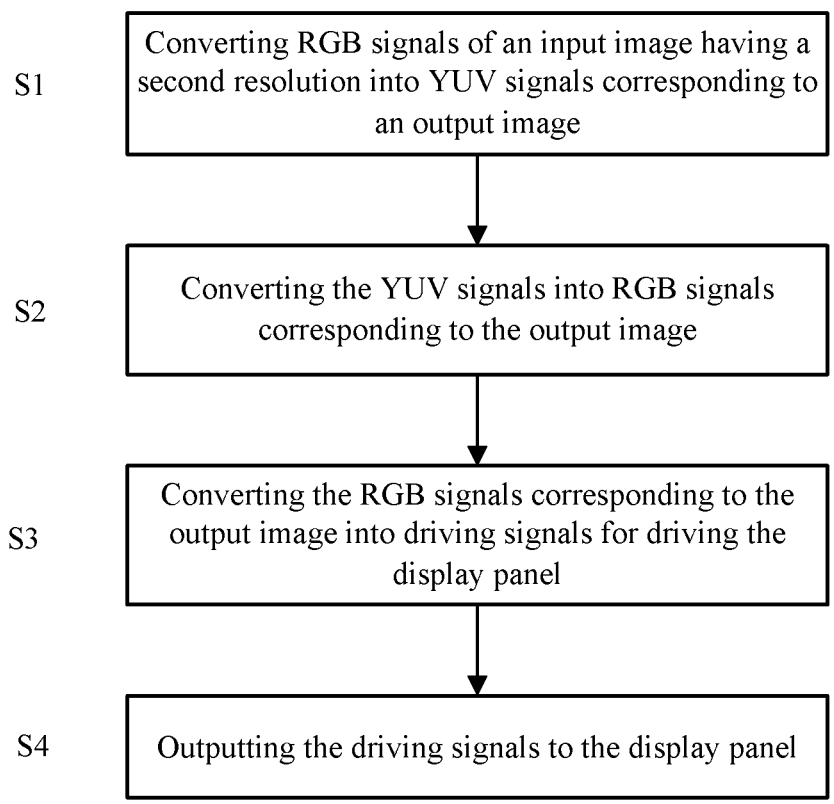
FIG. 1 is a schematic block diagram of a driving method for a display panel according to an embodiment of the present disclosure.

As an aspect of the present disclosure, there is provided a driving method for a display panel, the display panel has a first resolution, as shown in FIG. 1, the driving method comprises:

step S1, converting RGB signals of an input image having a second resolution into YUV signals corresponding to an output image, a resolution of the output image being not smaller than the second resolution;

step S2, converting the YUV signals obtained at step S1 into RGB signals corresponding to the output image;

step S3, converting the RGB signals obtained at step S2 into driving signals for driving the display panel; and step S4, outputting the driving signals obtained at step S3 to the display panel.

In the above driving method, the display panel is used to display the output image, thus a resolution of the output image may be the first resolution. Of course, also, the resolution of the output image may not be the first resolution. For example, when the resolution of the display panel is 10240×4320, the resolution of the output image may be 7680×4320, in this case, the output image is displayed in the middle of the display panel, a black border is displayed at two sides of the output image. In the driving method provided by the present disclosure, the first resolution and the second resolution may be the same or different.

When the first resolution and the second resolution are the same, an amount of pixels included in the input image is the same as an amount of pixels included in the output image. Thus, at step S1, RGB signals of the input image may be converted into YUV signals directly.

When the first resolution and the second resolution are different, an amount of pixels included in the input image is different than an amount of pixels included in the output image. In this case, at step S1, first, RGB signals of the input image are converted into YUV signals corresponding to the input image, thereafter, the YUV signals corresponding to the input image are enlarged to generate YUV signals corresponding to the output image. YUV signals are signals easy to be enlarged and shrunk. That is to say, the YUV signals may correspond to an image having a larger amount of pixels after being enlarged, and may correspond to an image having a smaller amount of pixels after being minified, and it can be ensured that image content does not change during enlarging and shrinking process of the YUV signals. Therefore, in the present disclosure, YUV signals corresponding to the output image can be obtained through step S1.

By means of processing the RGB signals of the input image, YUV signals corresponding to the output image can be obtained at step S1, thereafter, the YUV signals corresponding to the output image can be converted into RGB signals corresponding to the output image at step S2. The driving signals obtained at step S3 are used to drive the display panel, usually, the driving signals may be LVDS signals. At step S4, the driving signals are outputted to a timing control circuit (TCON) of the display panel.

It can be known from the above description that, when driving a display panel by using the driving method provided by the present disclosure, regardless whether a resolution of the input image is the same as a resolution of the display panel, driving of the display panel can be always implemented. For example, when the resolution of the display panel is 10240×4320, no matter how much the resolution of the input image is, driving of the display panel can be always implemented by using the method provided by the present disclosure.

First Embodiment

Figure 2A:
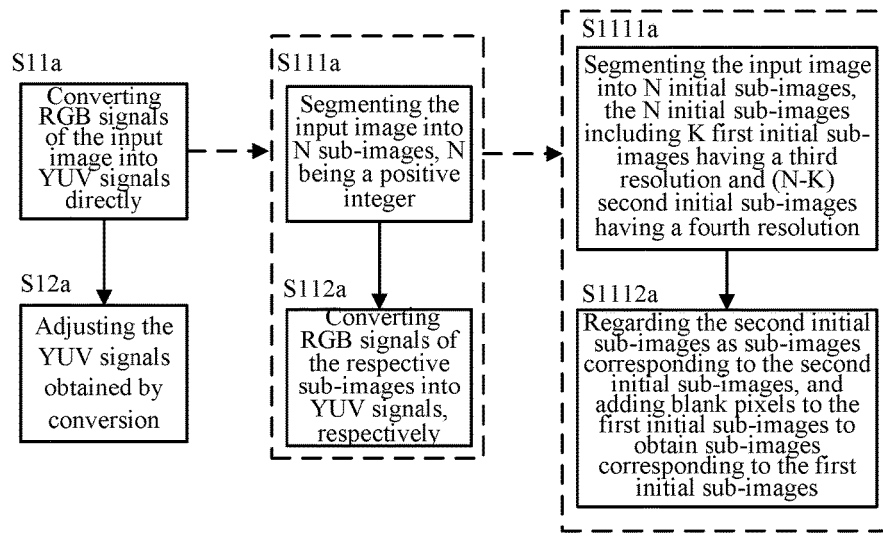
FIGS. 2A and 2B are schematic block diagrams of a driving method for a display panel according to a first embodiment of the present disclosure.
Figure 2B:
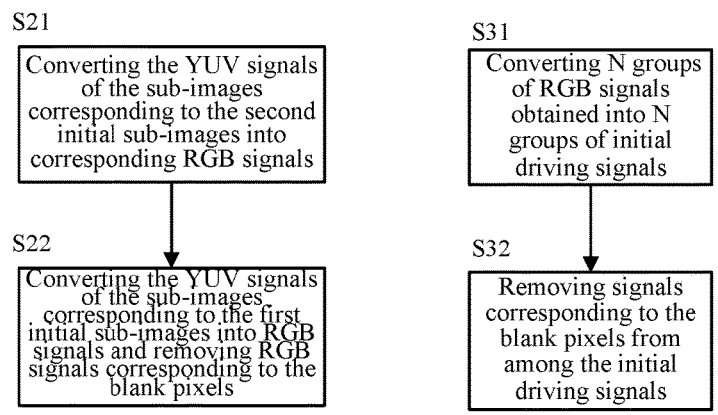

In the first embodiment, the first resolution is equal to the second resolution. In the first embodiment, as shown in FIG. 2A, step S1 may comprise:

step S11a: converting RGB signals of the input image into YUV signals directly; and step S12a: performing at least one of a brightness level adjustment, a color level adjustment, a black-white level adjustment, a hue adjustment, and a gamma adjustment on the YUV signals obtained at step S11a, so as to obtain adjusted YUV signals.

The display panel can have better display effect based on the adjusted YUV signals.

Since the resolution of the input image is very high and the input image includes a large amount of pixel information, information of the input image needs to be transmitted to the display panel in separate channels. Thus, step S11a may comprise:

step S111a, segmenting the input image into N sub-images, N being a positive integer, and preferably, 16≤N≤32; and step S112a, converting RGB signals of the respective sub-images into YUV signals, respectively.

Here, the N groups of YUV signals converted from the N sub-images in common form the YUV signals corresponding to an intermediate image.

Here, N is a fixed constant, that is, N is no longer changed once selected. Here, the number N is the number of channels for transmitting RGB signals. Since the input image includes a large amount of pixel information, thus a plurality of channels are required to transmit the input image, and it is required to segment the input image into a plurality of sub-images. In order to improve a transmission speed and simplify structure of a driving apparatus, preferably, 16≤N≤32.

Since N groups of YUV signals are obtained at step S112a, thus, at step S2, N groups of RGB signals are obtained after converting the N groups of YUV signals. Likewise, at step S3, N groups of driving signals for driving the display panel are obtained. At step S4, N groups of different driving signals drive different parts of the display panel, respectively, thus an output image can be displayed, and the output image also is formed by stitching the N sub-images.

Figures 3, 4:
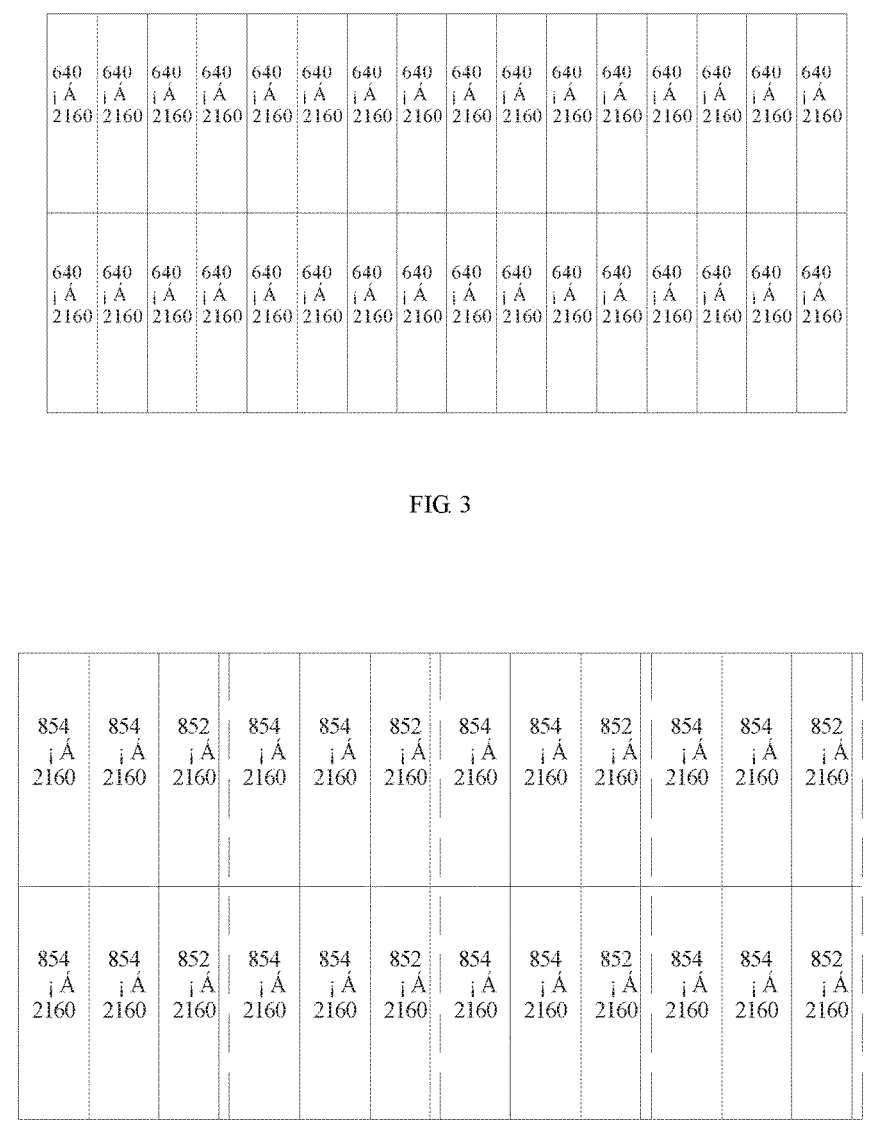

In the present disclosure, a specific value of N is not prescribed in particular, as long as the input image can be transmitted rapidly. As an implementation of the present disclosure, as shown in FIG. 3, the resolution of the display panel (i.e., the second resolution) is 10240×4320, and the resolution of the input image (i.e., the first resolution) also is 10240×4320, N may be 32. In this case, the input image may be segmented into N sub-images having the same resolution. Correspondingly, at step S111a, the input image (10240×4320) is segmented into thirty-two sub-images each having the resolution of 640×2160, and thirty-two different channels are used to transmit the thirty-two sub-images, respectively. Since the resolution of each sub-image is 640×2160, it can be known that the input image is segmented into sub-images in two rows and sixteen columns.

In the present disclosure, the RGB signals of the input image are transmitted by using a transmission port, the transmission port may be a V-by-One port, and may also be a DVI port. In order to increase the transmission speed, preferably, the V-by-One port is selected as the transmission port.

To reduce the number of ports for delivering the RGB signals, preferably, N may be 24. In this case, the input image cannot be segmented into N sub-images having the same resolution. Accordingly, step S111a may comprise:

at step S1111a, segmenting the input image into N initial sub-images, the N initial sub-images including K first initial sub-images having a third resolution and (N-K) second initial sub-images having a fourth resolution, the third resolution being smaller than the fourth resolution; and at step S1112a, regarding the second initial sub-images as sub-images corresponding to the second initial sub-images, and adding blank pixels to the first initial sub-images to obtain sub-images corresponding to the first initial sub-images, an amount of the blank pixels being equal to a difference between the fourth resolution and the third resolution.

As shown in FIG. 4, the resolution of the input image is 10240×4320, the resolution of the display panel also is 10240×4320, and N is 24, at step S1111a, the input image is segmented into initial sub-images in two rows and twelve columns, eight first initial sub-images having the resolution of 852×2160 and sixteen second initial sub-images having the resolution of 854×2160 are contained in the initial sub-images; and at step S1112a, the second initial sub-images are regarded as sub-images corresponding to the second initial sub-images, and two columns of blank pixels (2×2160 blank pixels) are added to the first initial sub-images, to obtain sub-images corresponding to the first initial sub-images.

As described above, when the resolution of the input image is 10240×4320 and N is 24, the number of pixels in a horizontal direction of the input image is 10240, not an integer multiple of 12, which results in that an amount of pixels in the respective initial sub-pixels may probably not be equal. Since an amount of data transmitted by each channel (i.e., the transmission port) is the same, in order to avoid confusion, preferably, as described above, it is possible to make the resolutions of a plurality of sub-images finally obtained be the same by means of inserting blank pixels into the first initial sub-images. In the present disclosure, the so-called "blank pixels" do not carry display information, adding the blank pixels only aims to make a signal format be more uniform. In FIG. 4, a space defined with a broken line and a solid line at the left of the broken line represents the added "blank pixels".

In the present disclosure, a position of the first initial sub-images is not prescribed in particular, as long as the resolution of the sub-images obtained after adding the blank pixels to the first initial sub-images is the same as the resolution of the second initial sub-images.

Since the blank pixels are added to the sub-images corresponding to the first initial sub-images, in order to achieve that content of the output image is the same as content of the input image, it is required to remove signals corresponding to the blank pixels. Thus, step S2 may comprise:

step S21, converting the YUV signals of the sub-images corresponding to the second initial sub-images into corresponding RGB signals; and step S22, converting the YUV signals of the sub-images corresponding to the first initial sub-images into RGB signals and removing RGB signals corresponding to the blank pixels.

Of course, the RGB signals corresponding to the blank pixels may not be removed at step S22, instead, driving signals corresponding to the blank pixels are removed at step S3.

Since the resolution of the output image is 10248×4320, the output image has a quite large amount of information, in order to quickly output the driving signals, correspondingly, step S3 comprises: step S31, converting N groups (24 groups) of RGB signals obtained at step S2 into N groups (24 groups) of initial driving signals.

In a case where the RGB signals corresponding to the blank pixels are removed at step S2, or the RGB signals obtained at step S2 include no blank pixels, at step S3, the N groups (24 groups) of initial driving signals are regarded as N groups of driving signals for driving different parts of the display panel.

In a case where the RGB signals corresponding to the blank pixels are not removed at step S2, instead the driving signals corresponding to the blank pixels are removed at step S3, step S3 further comprises: step S32, removing signals corresponding to the blank pixels from among the initial driving signals to obtain N groups of driving signals for driving different parts of the display panels. Preferably, the first initial sub-images are distributed evenly between the second initial sub-images. Specifically, as shown in FIG. 4, the first initial sub-images are the initial sub-images in an i-th row and an 3j-th column, where i is a positive integer, i=1, 2, and j is a positive integer, j=1, 2, 3, and 4. That is, the initial sub-image in the first row and the third column, the initial sub-image in the first row and the sixth column, the initial sub-image in the first row and the ninth column, the initial sub-image in the first row and the twelfth column, the initial sub-image in the second row and the third column, the initial sub-image in the second row and the sixth column, the initial sub-image in the second row and the ninth column, and the initial sub-image in the second row and the twelfth column all are the first initial sub-images.

The implementation in a case where the first resolution is equal to the second resolution is described above. A case where the second resolution is smaller than the first resolution will be described below.

Second Embodiment

Figure 5A:
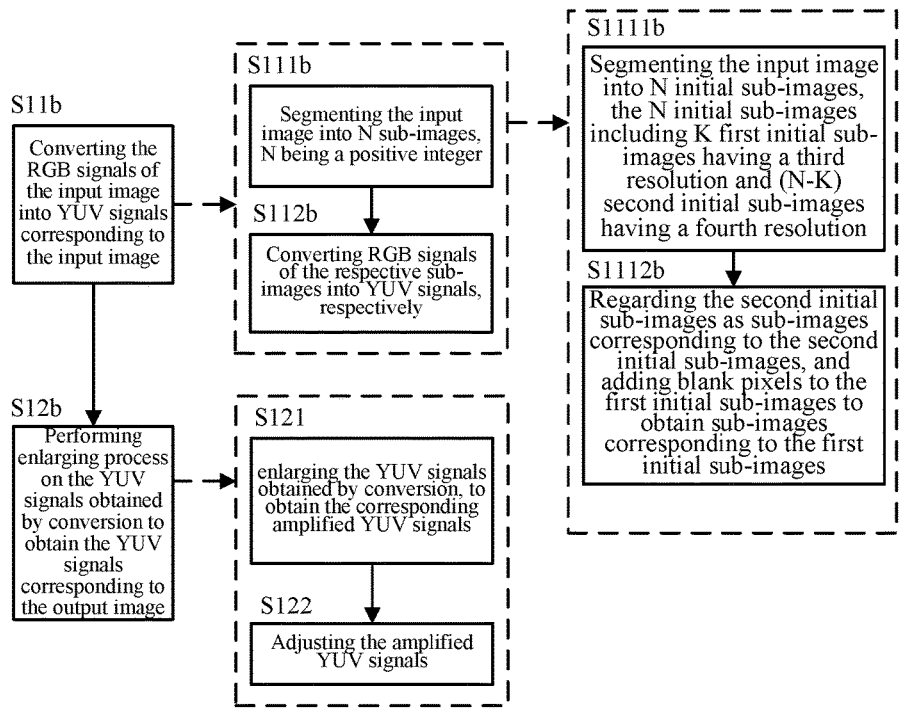
FIGS. 5A and 5B are schematic block diagrams of a driving method for a display panel according to a second embodiment of the present disclosure.
Figure 5B:
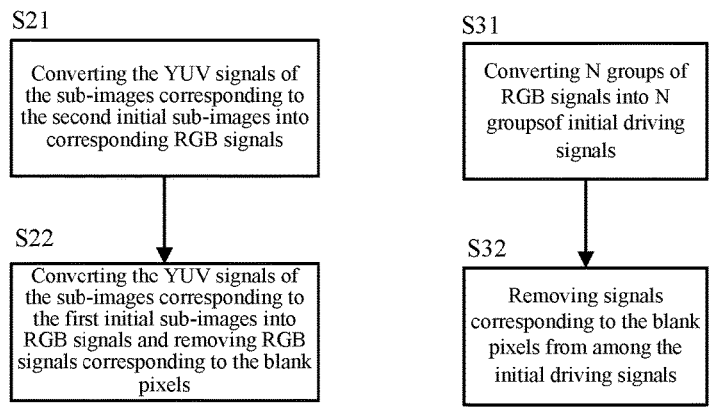

In the second embodiment, the resolution of the input image (the second resolution) is smaller than the resolution of the output image (the first resolution). In the second embodiment, as shown in FIG. 5A, step S1 may comprise:

step S11b, converting the RGB signals of the input image into YUV signals corresponding to the input image; and step S12b, performing enlarging process on the YUV signals obtained at step S11b to obtain the YUV signals corresponding to the output image.

Since the second resolution is smaller than the first resolution, an amount of pixels of the input image is smaller than an amount of pixels of the output image, thus it is required to perform enlarging process on the YUV signals of the input image at step S12b. After the YUV signals corresponding to the output image are obtained at step S12b, RGB signals corresponding to the output image may be obtained at step S2.

For the output image to have better display effect, preferably, step S12b comprises:

step S121, enlarging the YUV signals obtained at step S11b, to obtain the corresponding enlarged YUV signals; and step S122, performing at least one of a brightness level adjustment, a color level adjustment, a black-white level adjustment, a hue adjustment, and a gamma adjustment on the enlarged YUV signals obtained at step S121, so as to obtain YUV signals corresponding to the output image.

In this implementation, the resolution of the input image is not prescribed in particular, so long as the resolution of the input image is smaller than the first resolution.

For example, the resolution of the input image may be 3840×2160, may also be 7680×4320, and also be 5120×2160. Optionaly, the input image having the aforesaid resolutions needs also to be segmented into a plurality of sub-images and thereafter transmitted. Thus, step S11b may comprise:

step S111b, segmenting the input image into N sub-images, N being a positive integer; and step S112b, converting RGB signals of each of the sub-images into YUV signals, respectively.

Herein, the N groups of YUV signals converted from the N sub-images in common form the YUV signals corresponding to an intermediate image.

For example, as shown in FIG. 6, the resolution of the input image is 3840×2160, since the input image having the resolution of 3840×2160 has a small amount of information, thus the input image having the resolution of 3840×2160 may be segmented into only four sub-images. In this case, the input image may be segmented into N (4) sub-images having the same resolution. Specifically, at step S111b, the input image is segmented into four sub-images in two rows and two columns in total.

It is easy to understand that, the resolutions of the four sub-images obtained at step S111b all are 1920×1080.

In this case, YUV signals respectively corresponding to the four sub-images are obtained at step S112b, the YUV signals respectively corresponding to the four sub-images in common form the YUV signals corresponding to the input image, at step S12, enlarging process is performed on the YUV signals obtained at step S112b.

As another example, as shown in FIG. 7, the resolution of the input image may be 7680×4320, since the input image having the resolution of 7680×4320 also carries a relatively large amount of information, thus, the input image having the resolution of 7680×4320 can be segmented into sixteen sub-images. In this case, the input image may be segmented into N (16) sub-images having the same resolution. Specifically, at step S111b, the input image is segmented into sixteen sub-images in four rows and four columns in total. It is easy to understand that, the resolutions of the respective sub-images obtained at step S111b all are 1920×1080.

In this case, the YUV signals respectively corresponding to the sixteen sub-images are obtained at step S112b, and the YUV signals respectively corresponding to the sixteen sub-images in common constitute YUV signals corresponding to the input image. At step S12, enlarging process is performed on the YUV signals obtained at step S112b.

On the other hand, in a case where the input image cannot be segmented into N sub-images having the same resolution, step S111b may comprise:

step S1111b, segmenting the input image into N initial sub-images, the N initial sub-images including K first initial sub-images having a third resolution and (N-K) second initial sub-images having a fourth resolution, the third resolution being smaller than the fourth resolution; and step S1112b, regarding the second initial sub-images as sub-images corresponding to the second initial sub-images, and adding blank pixels to the first initial sub-images to obtain sub-images corresponding to the first initial sub-images, an amount of the blank pixels being equal to a difference between the fourth resolution and the third resolution.

For example, the resolution of the input image may be 5120×2160, the input image having the resolution of 5120×2160 may be segmented into six sub-images. Specifically, at step S1111b, the input image is segmented into six initial sub-images in one row and six columns in total, two first initial sub-images having the resolution of 852×2160 and four second initial sub-images having the resolution of 854×2160 are contained in the initial sub-images; and at step S1112b, the second initial sub-images are regarded as sub-images corresponding to the second initial sub-images, and two columns of blank pixels (2×2160 blank pixels) are added in the first initial sub-images to obtain sub-images corresponding to the first initial sub-images.

Since the blank pixels are added to the sub-images corresponding to the first initial sub-images, in order to implement that content of the output image and content of the input image are the same, signals corresponding to the blank pixels need to be removed, thus, step S2 comprises:

step S21, converting the YUV signals of the sub-images corresponding to the second initial sub-images into corresponding RGB signals; and step S22, converting the YUV signals of the sub-images corresponding to the first initial sub-images into RGB signals and removing RGB signals corresponding to the blank pixels.

As an implementation of the present disclosure, the first initial sub-images are the initial sub-images in the third column and the sub-images in sixth column, the rest initial sub-images are the second initial sub-images, as shown in FIG. 8.

For the viewer to see a coherent picture, a frequency of the output image should not be less than 60 Hz. The frequency of the input image is determined by a video source that provides the input image, as an implementation, the frequency of the input image is equal to the frequency of the output image, in this implementation, there is no need to adjust the frequency of the input image. When the frequency of the input image is smaller than the frequency of the output image, prior to step S1, the driving method further comprises: adjusting the frequency of the input image to make the frequency of the input image reach the frequency of the output image.

The frequency adjusting method may comprise copying the input image, until the frequency of the image obtained after copying reaches the frequency of the output image.

When the first resolution of the display panel is 10240×4320, the resolution of the output image also is 10240×4320, therefore, an amount of data for driving the display panel is also very large, in order to increase an output speed, the driving signal may be segmented into a plurality of groups to output. That is, preferably, step S3 comprises: converting the RGB signals obtained at step S2 into M groups of driving signals to output. In the present disclosure, 16≤M≤32, and M is a positive integer.

In order to simplify the structure for transmitting the driving signals and ensure the transmission speed, preferably, M is 24, among the M (24) groups of driving signals, J (20) groups correspond to the sub-image having the fifth resolution (427×4320), (M-J) (4) groups correspond to the sub-images having the sixth resolution (425×4320). The sub-images described herein refer to sub-images displayed on the display panel, and the sub-images displayed on the display panel driven by the twenty-four groups of driving signals form the output image.

Hereinafter, specific steps of the driving method when the resolution of the input image is 3840×2160 as provided by the present disclosure will be introduced.

Figure 9:
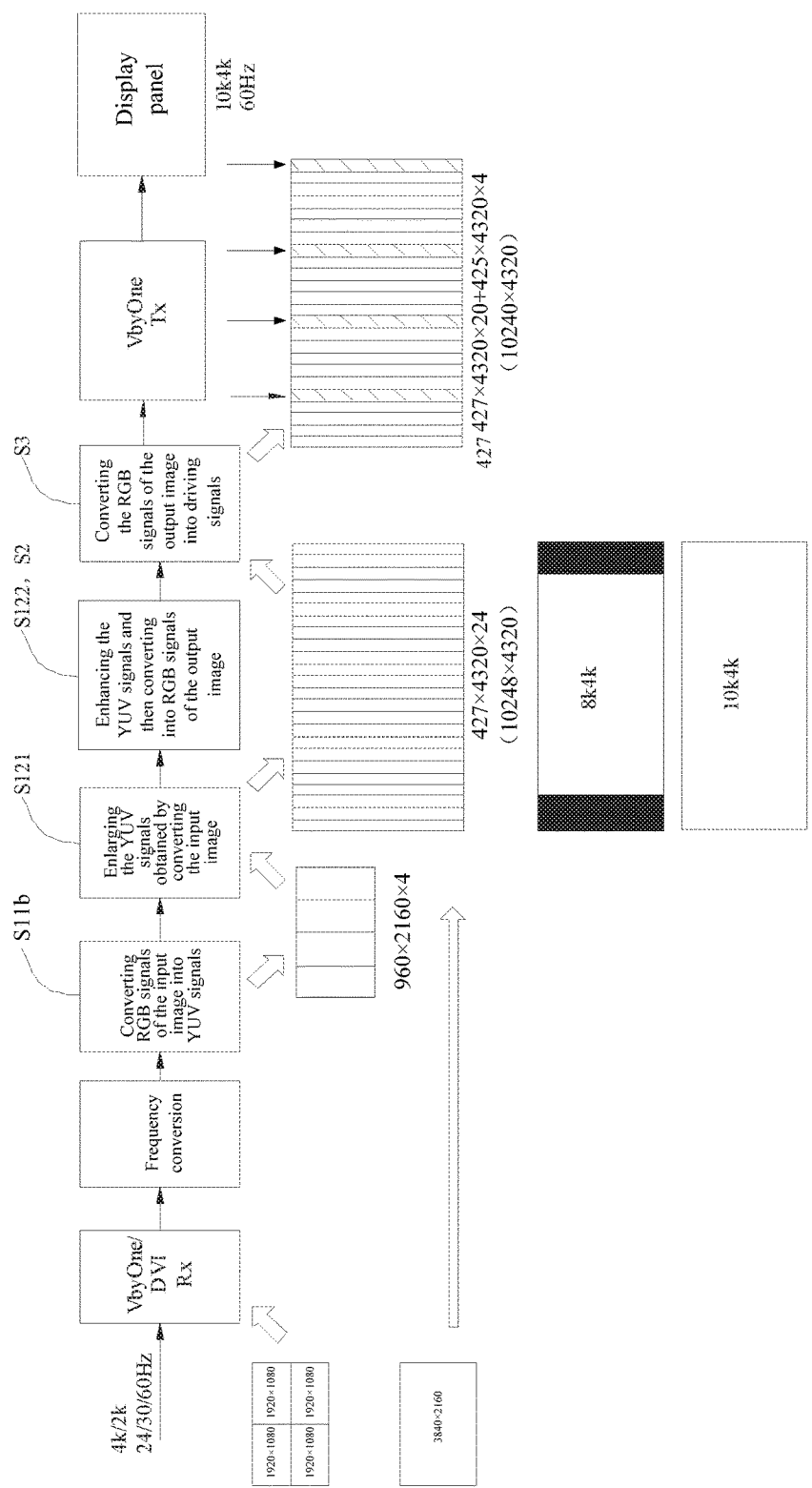
FIG. 9 is a schematic flowchart of driving a display panel having a resolution of 10240×4320 with an input image having a resolution of 3840×2160.

As shown in FIG. 9, when the resolution of the input image is 3840×2160, the driving method provided by the present disclosure comprises two implementations.

In a first implementation, at step S11b, at step S111b in particular, the input image is segmented into four (N=4) sub-images having the resolution of 1920×1080 in two rows and two columns; and at step S112b, RGB signals of each of the sub-images are converted into YUV signals.

In a second implementation, the input image is not segmented, at step S11b in particular, the RGB signals of the input image are directly converted into YUV signals corresponding to the input image.

Thereafter, at step S12b, at step S121 in particular, the YUV signals obtained at step S11b are enlarged, to obtain the enlarged YUV signals; and at step S122, at least one of a brightness level adjustment, a color level adjustment, a black-white level adjustment, a hue adjustment, and a gamma adjustment is performed on the YUV signals corresponding to an intermediate image obtained at step S121, so as to obtain YUV signals corresponding to the output image.

For example, the YUV signals obtained at step S121 are segmented into four groups, the four groups correspond to four images having the resolution of 960×2160,respectively, at step S122, the respective YUV signals corresponding to the image having the resolution of 960×2160 are enlarged.

Thereafter, at step S2, the YUV signals (10248×4320) obtained at step S122 are converted into RGB signals corresponding to the output image. The RGB signals obtained at step S2 correspond to twenty-four groups of image having the resolution of 427×4320 (i.e., image of 10248×4320). Among the twenty-four groups of image, there are eight columns of blank pixels (8×4320 blank pixels).

At step S3, the RGB signals corresponding to the output image are converted into the driving signals. Since what is obtained at step S2 is twenty-four groups of image having the resolution of 427×4320 (i.e., image of 10248×4320), and the resolution of the display panel is 10240×4320, thus, at step S3, the driving signals corresponding to the blank pixels need to be removed, so as to obtain twenty groups of driving signals corresponding to the sub-images having the resolution of 427×4320 and four groups of driving signals corresponding to the sub-images having the resolution of 425×4320. In FIG. 9, the part identified with the oblique profile lines is the sub-images having the resolution of 425×4320.

At step S4, the driving signals are transmitted to a timing controller TCON of the display panel, so as to drive the display panel.

If the frequency of the input image is different than the frequency of the required output image, then the driving method further comprises a frequency conversion step performed prior to step S1. For example, when the frequency of the input image is 24 Hz or 30 Hz, and the frequency of the output image required is 60 Hz, then it needs to covert the frequency of the input image into 60 Hz. When the frequency of the input image is 60 Hz, the frequency conversion step may be skipped.

As will be easily understood, the display panel having the resolution of 10240×4320 can display not only the output image having the resolution of 10240×4320, but also the output image having the resolution of 7860×4320. In this case, it only needs to select to enlarge the YUV signals corresponding to the input image into the YUV signals corresponding to the output image having the resolution of 7860×4320. As shown in FIG. 9, when using the display panel having the resolution of 10240×4320 to display the output image having the resolution of 7860×4320, the output image is displayed in the middle of the display panel, a black border is displayed at two sides of the output image.

As will be readily appreciated by those skilled in the art, Rx represents a port that receives signals, and Tx represents a port that outputs signals. VbyOne/DVI Rx represents that the port that receives signals may be a VbyOne port or a DVI port. VbyOne Tx represents that the port that outputs signals may be a VbyOne port.

Hereinafter, specific steps of the driving method when the resolution of the input image is 5120×2160 as provided by the present disclosure will be introduced in conjunction with FIG. 10.

At step S11b, at step S1111b of step S111b in particular, the input image is segmented into six initial sub-images in one row and six columns in total, and two first initial sub-images having the resolution of 852×2160 and four second initial sub-images having the resolution of 854×2160 are contained in the initial sub-images; at step S1112b, the second initial sub-images are regarded as sub-images corresponding to the second initial sub-images, and two columns of blank pixels (2×2160 blank pixels) are added to the first initial sub-images to obtain the sub-images corresponding to the first initial sub-images, wherein an amount of the blank pixels is equal to the difference between the resolution of 854×2160 and the resolution of 852×2160. Thereafter, at step S112b, the RGB signals of each of the sub-images are converted into YUV signals.

Figure 10:
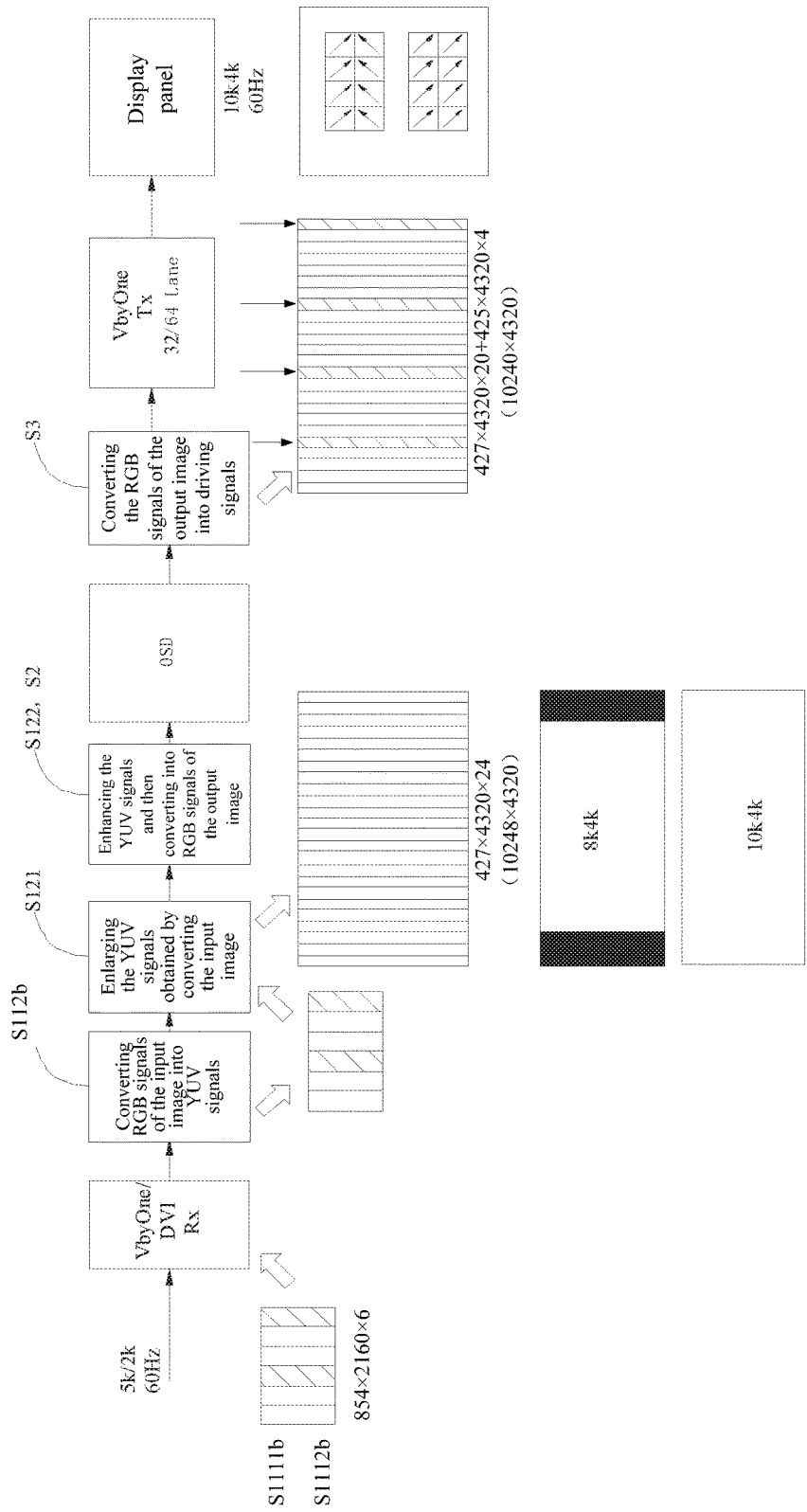
FIG. 10 is a schematic flowchart of driving a display panel having a resolution of 10240×4320 with an input image having a resolution of 5120×2160.

At step S12b, at step S121 in particular, the YUV signals obtained at step S11b are enlarged to obtain the enlarged YUV signals, as shown in FIG. 10, the resolution of the enlarged YUV signals may be 10248×4320; and at step S122, at least one of a brightness level adjustment, a color level adjustment, a black-white level adjustment, a hue adjustment, and a gamma adjustment is performed on the enlarged YUV signals obtained at step S121, so as to obtain YUV signals corresponding to the output image.

Thereafter, at step S2, at step S21 in particular, the YUV signals of the sub-images corresponding to the second initial sub-images are converted into the corresponding RGB signals; and at step S22, the YUV signals of the sub-images corresponding to the first initial sub-images are converted into RGB signals, and RGB signals corresponding to the blank pixels are removed.

Thereafter, at step S3, the RGB signals obtained at step S2 are converted into driving signals. Steps S3 and S4 are the same as steps S3 and S4 in the driving method when the input image is 3840×2160, no more detailed repeated here. In FIG. 10, the part identified with the oblique profile lines is the sub-images having the resolution of 425×4320.

Figure 11:
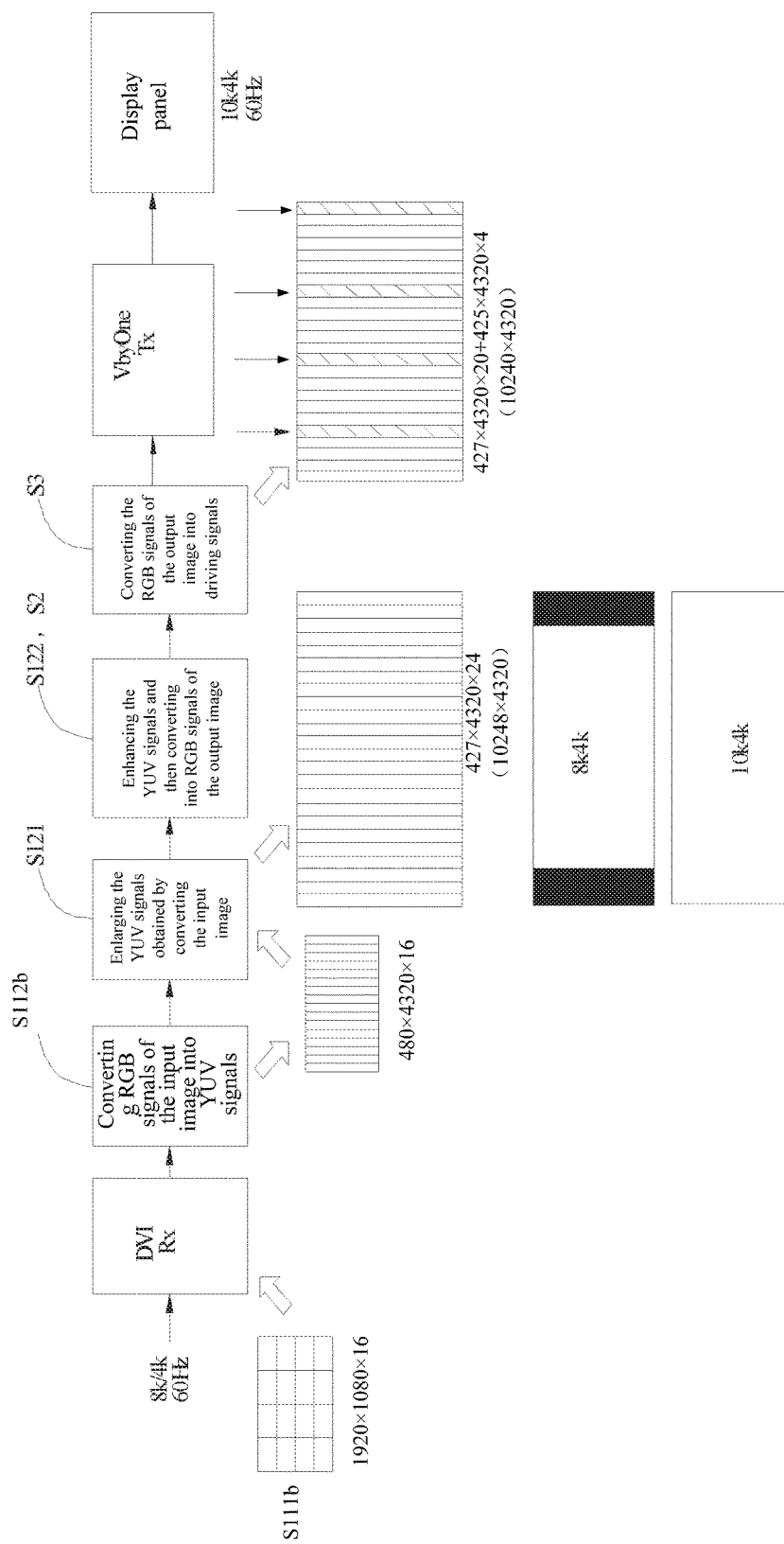
FIG. 11 is a schematic flowchart of driving a display panel having a resolution of 10240×4320 with an input image having a resolution of 7680×4320.

Specific steps of the driving method when the resolution of the input image is 5120×2160 provided by the present disclosure will be introduced in conjunction with FIG. 11.

In the implementation shown in FIG. 11, at step S11b, at step S111b in particular, the input image is segmented into 16 sub-images in four rows and four columns in total; and at step S112b, the RGB signals of the respective sub-images are converted into the YUV signals, respectively.

At step S112b, 16 YUV signals corresponding to the sub-images having the resolution of 480×4320 are obtained.

Next, at step S12b, and at step S121 in particular, the sixteen YUV signals corresponding to the sub-images having the resolution of 480×4320 are enlarged, thereafter, at step S2, twenty-four RGB signals corresponding to the sub-images having the resolution of 427×4320 are obtained, and eight columns of blank pixels (2×4320×4 blank pixels) are contained among the twenty-four RGB signals corresponding to the image having the resolution of 427×4320.

Steps S3 and S4 are the same as steps S3 and S4 in the driving method when the input image is 3840×2160, no more details repeated here.

Hereinafter, specific steps of the driving method when the resolution of the input image is 10240×4320 as provided by the present disclosure will be introduced in conjunction with FIG. 12.

Figure 12:
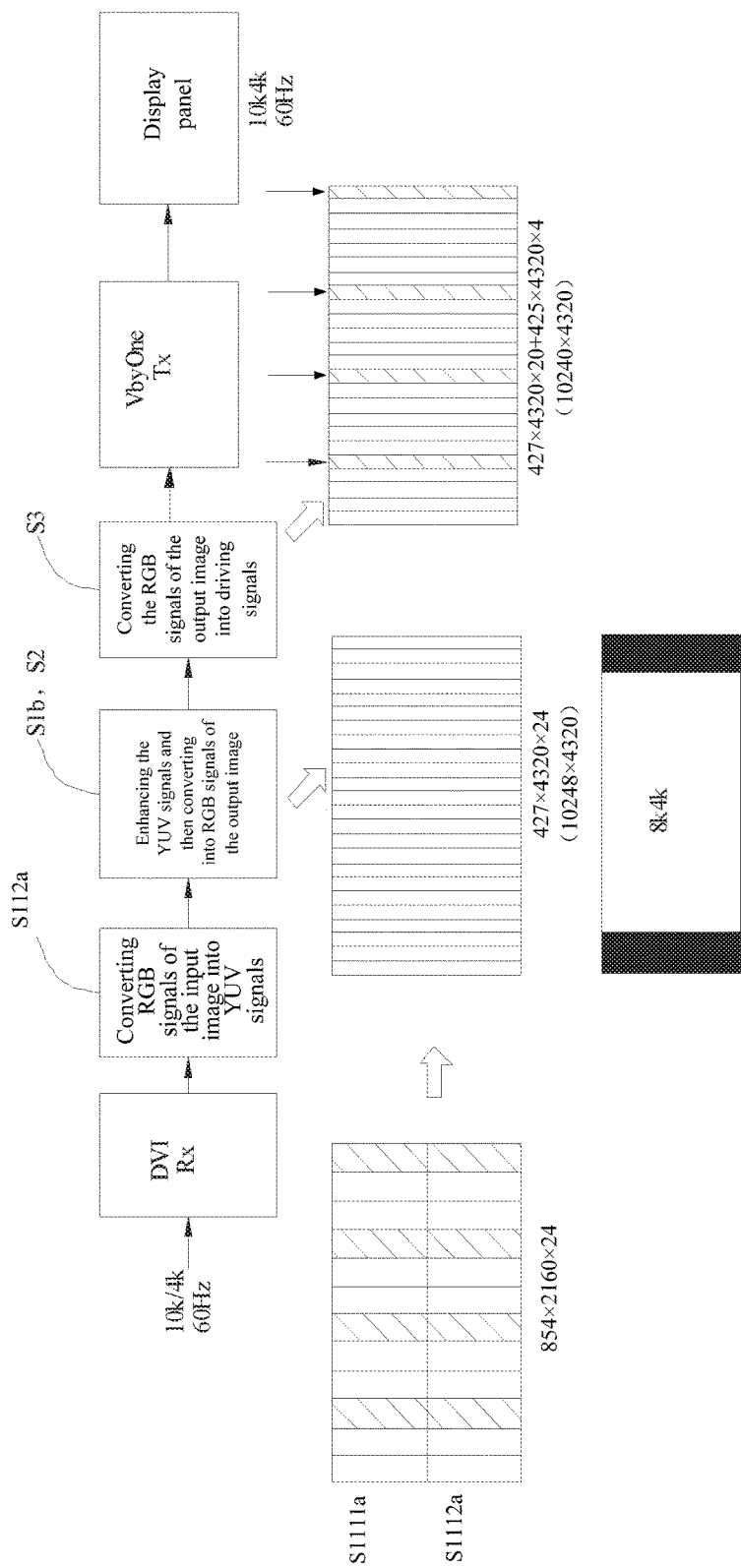
FIG. 12 is a schematic flowchart of driving a display panel having a resolution of 10240×4320 with an input image having a resolution of 10240×4320.

In the implementation shown in FIG. 12, the resolution of the input image is the same as the resolution of the display panel, and the same as the resolution of the output image.

In this implementation, at step S11a, at step S1111a in particular, the input image is segmented into sub-images in two rows and twelve columns (N=24), the initial sub-images in two rows and twelve columns include eight first initial sub-images having the resolution of 852×2160 and sixteen second initial sub-images having the resolution of 854×2160; and at step S1112a, the second initial sub-images are regarded as sub-images corresponding to the second initial sub-images, and two columns of blank pixels (2×2160 blank pixels) are added to the first initial sub-images, to obtain sub-images corresponding to the first initial sub-images, wherein the number of the blank pixels is equal to the difference between the resolution of 854×2160 and the resolution of 852×2160; next, at step S112a, the RGB signals of each of the sub-images are converted into YUV signals.

Thereafter, at step S12a, at least one of a brightness level adjustment, a color level adjustment, a black-white level adjustment, a hue adjustment, and a gamma adjustment is performed on the YUV signals obtained at step S112a, so as to obtain the adjusted YUV signals.

At step S2, the adjusted N (24) groups of YUV signals are converted into N (24) groups of RGB signals.

Thereafter, at step S3, at step S31 in particular, N groups (24 groups) of RGB signals obtained at step S2 are converted into N groups (24 groups) of initial driving signals; and at step S32, signals corresponding to the blank pixels are removed from the initial driving signals, so as to obtain N groups of driving signals.

Step S4 is the same as that in the other cases, no more details repeated here.

Figure 13:
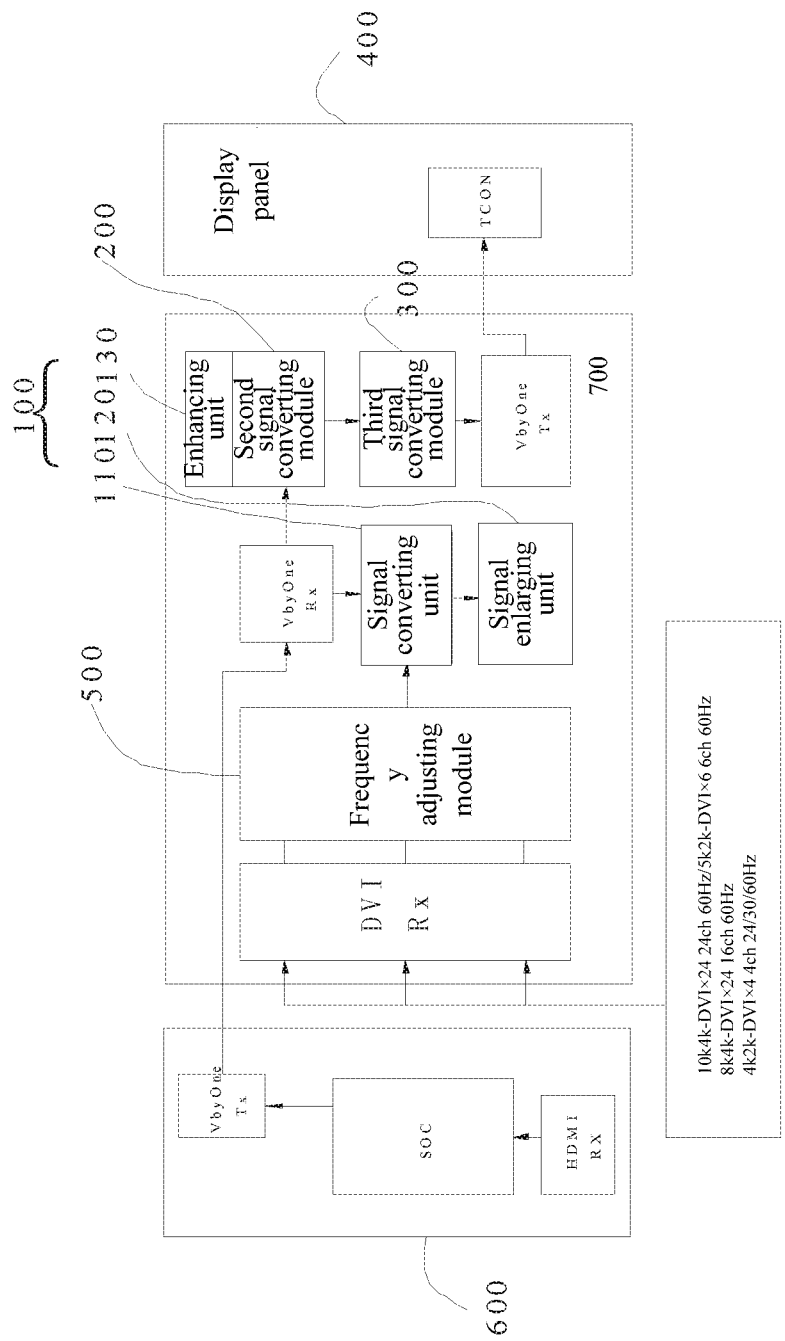
FIG. 13 is a schematic diagram of modules of a driving apparatus according to an embodiment of the present disclosure.
Figure 14:
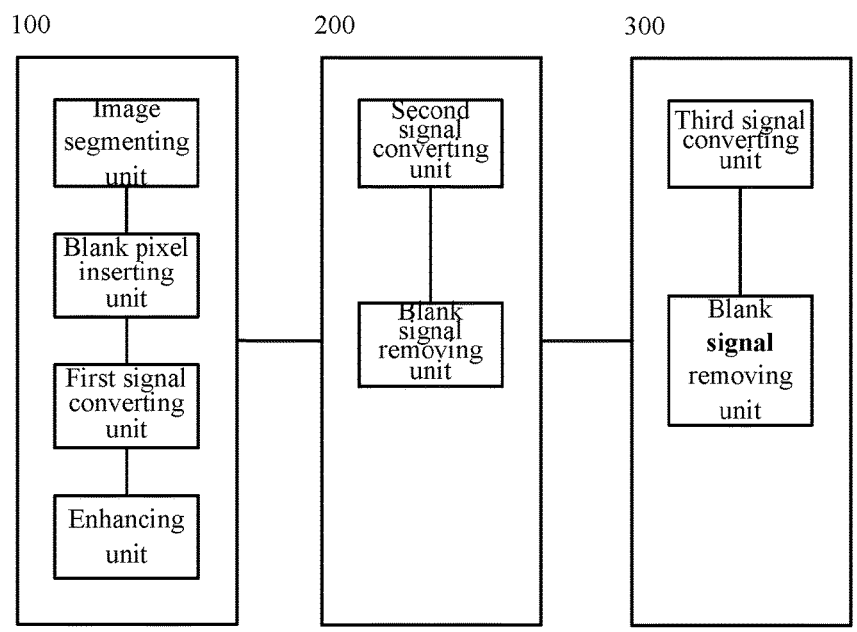
FIG. 14 is a schematic block diagram of specific structure of a driving apparatus according to an embodiment of the present disclosure.

In order to execute the above driving method, as another aspect of the present disclosure, there is provided a driving apparatus for a display panel 400, the display panel 400 has a first resolution, as shown in FIG. 13, the driving apparatus comprises: a first signal converting module 100, a second signal converting module 200, a third signal converting module 300, and a signal output module 700.

The first signal converting module 100 is configured to convert RGB signals of an input image having a second resolution into YUV signals corresponding to an output image, a resolution of the output image being not smaller than the second resolution.

The second signal converting module 200 is configured to convert the YUV signals obtained in the first signal converting module 100 into RGB signals corresponding to the output image.

The third signal converting module 300 is configured to convert the RGB signals obtained in the second signal converting module 200 into driving signals for driving the display panel 400.

The signal output module 700 is configured to output the driving signals obtained in the third signal converting module 300 to the display panel 400.

The first signal converting module 100 is configured to execute step S1, the second signal converting module 200 is configured to execute step S2, the third signal converting module 300 is configured to execute step S3, and the signal output module 500 is configured to execute step S4.

For the output image to have better display effect, preferably, the first signal converting module 100 comprises a first signal converting unit 110 and an enhancing unit 130, the first signal converting unit 110 is configured to covert RGB signals of the input image into YUV signals, and is used to execute steps S112a, S112b, and S121, the enhancing unit 130 is configured to perform at least one of a brightness level adjustment, a color level adjustment, a black-white level adjustment, a hue adjustment, and a gamma adjustment on the YUV signals generated by the first signal converting unit and is used to execute steps S12a and S122.

Since the input image has a higher resolution, thus the input image includes a large amount of pixels, in order to facilitate transmission, preferably, the input image may be segmented during transmission of the input image. Preferably, the first signal converting module 100 further comprises an image segmenting unit (not shown), the image segmenting unit is configured to segment the input image into N sub-images and used to execute steps S1111*a* (S1111*a*) and S111*b* (S1111*b*), the signal converting unit 110 is capable of converting RGB signals of each sub-image into YUV signals of said sub-image, wherein N is a positive integer.

In the present disclosure, a specific number of N is determined according to the resolution of the input image. For example, when the resolution of the input image is 3840×2160, N is 4; when the resolution of the input image is 5120×2160, N is 6; when the resolution of the input image is 7680×4320, N is 16; when the resolution of the input image is 10240×4320, N is 24.

Preferably, the first signal converting module 100 further comprises a blank pixel inserting unit (not shown), the blank pixel inserting unit can insert a predetermined number of blank pixels at a predetermined position of the input image in a case where the input image cannot be segmented into N sub-images having the same resolution, and the blank pixel inserting unit is used to execute steps S1112*a* and S1112*b*.

Correspondingly, the second signal converting module 200 may comprise a second signal converting unit (not shown) and a blank signal removing unit (not shown), the second signal converting unit is configured to convert the YUV signals of the sub-images into RGB signals and used to execute step S21, and the blank signal removing unit is configured to remove RGB signals corresponding to the blank pixels, and used to execute step S22.

Specifically, the resolution of the input image is 10240×4320, the image segmenting unit can segment the input image into twenty-four initial sub-images in two rows and twelve columns in total, eight first initial sub-images having the resolution of 852×2160 and sixteen second initial sub-images having a resolution of 854×2160 are contained in the initial sub-images, the blank pixel inserting unit can insert two columns of blank pixels into the first initial sub-images.

The third signal converting module 300 comprises a driving signal generating unit (not shown) and a blank pixel signal removing unit (not shown), the driving signal generating unit is configured to convert the RGB signals obtained in the second signal converting module into initial driving signals and is used to execute step S31, and the blank pixel signal removing unit is configured to remove driving signals corresponding to the blank pixels from among the initial driving signals and is used to execute step S32.

When the input image has a resolution of 10240×4320, the first initial sub-images are initial sub-images in an i-th row and a 3j-th column, wherein i is a positive integer, i=1, 2, j is a positive integer, and j=1, 2, 3, 4. That is, the predetermined position mentioned above is in the first row and the third column, the first row and the sixth column, the first row and the ninth column, the first row and the twelfth column, the second row and the third column, the second row and the sixth column, the second row and the ninth column, the second row and the twelfth column.

In order to enable the driving apparatus to drive the display panel 400 having a higher resolution with the input image having a lower resolution, preferably, the first signal converting module 100 further comprises a signal enlarging unit 120 configured to enlarge the YUV signals corresponding to the input image to obtain the YUV signals corresponding to the output image with the first resolution. Correspondingly, the enhancing unit 130 is configured to perform at least one of a brightness level adjustment, a color level adjustment, a black-white level adjustment, a hue adjustment, and a gamma adjustment on the YUV signals outputted by the enlarging unit, so as to obtain YUV signals corresponding to the output image having the first resolution.

When the input image has a resolution of 5120×2160, the image segmenting unit can segment the input image into six initial sub-images in one row and six columns, four first initial sub-images having a resolution of 852×2160 and two second initial sub-images having a resolution of 854×2160 are contained in the initial sub-images, the blank pixel inserting unit can insert two columns of blank pixels into the first initial sub-images. Preferably, the first initial sub-images are the initial sub-image in the third column and the initial sub-image in the sixth column.

To achieve inputting with a low frequency and outputting with a high frequency, preferably, the driving apparatus further comprises a frequency adjusting module 500, the frequency adjusting module 500 is configured to perform frequency adjustment on the input image when the frequency of the input image is smaller than the frequency of the output image, so that the frequency of the input image reaches the frequency of the output image.

Since the resolution of the output image is 10240×4320, thus, the driving signals need to be outputted in separated groups, correspondingly, the third signal converting module 300 comprises a driving signal segmenting unit, the driving signal segmenting unit is configured to segment the RGB signals outputted by the second signal converting module 200 into M groups, wherein the driving signal generating unit converts the M groups of RGB signals into M groups of driving signals, 16≤M≤32, and M is a positive integer.

As a specific implementation of the present disclosure, M is 24, among the M groups of driving signals, twenty groups correspond to the image having a resolution of 427×4320, and four groups correspond to an image having a resolution of 425×4320.

As another aspect of the present disclosure, there is provided a display device, the display apparatus comprises a driving apparatus and a display panel 400, the display panel 400 has a first resolution, an output terminal of the driving apparatus is connected to an input terminal of the display device, wherein the driving apparatus is any of the driving apparatus provided above by the present disclosure.

As a preferred implementation of the present disclosure, the resolution of the display panel is 10240×4320.

As shown in FIG. 13, in order to reduce a size of a display system, the driving apparatus may be integrated in a FPGA or an ASIC. The display system may also comprise a video input module 600, this video input module receives a video file via an HDMI receiving port, and uses a Vbyone transmission port to make a transmission to the driving apparatus after processing the video file by SOC.

Alternatively, image files may be directly transmitted to the driving apparatus.

As will be appreciated, the above implementations are exemplary implementations adopted to illustrate the principles of the present disclosure, however, the present disclosure is not limited thereto, those of ordinary skill in the art can make various modifications and variations without departing from the spirit and scope of the present disclosure. These modifications and variations all fall into the protection scope of the present disclosure.

This application claims priority to a preceding Chinese patent application having an application number of "201510263265.5" and an invention title of "driving method and driving apparatus for a display panel, and display device" filed on May 21, 2015, the disclosure of which is incorporated herein by reference in entirety.

What is claimed is:

1. A driving method for a display panel, the display panel having a first resolution, the driving method comprising:
converting RGB signals of an input image having a second resolution into YUV signals corresponding to an output image, a resolution of the output image being not smaller than the second resolution;
converting the YUV signals into RGB signals corresponding to the output image;
converting the RGB signals corresponding to the output image into driving signals for driving the display panel; and
outputting the driving signals to the display panel,
wherein the converting the RGB signals of the input image having the second resolution into the YUV signals corresponding to the output image comprises:
segmenting the input image into N sub-image, N being a positive integer; and
converting RGB signals of each of the sub-images into a group of YUV signals, to obtain N groups of YUV signals,
wherein, in a case where the input image cannot be segmented into N sub-images having a same resolution, the segmenting the input image into N sub-images comprises:
segmenting the input image into N initial sub-images, the N initial sub-images including K first initial sub-images having a third resolution and (N-K) second initial sub-images having a fourth resolution, the third resolution being smaller than the fourth resolution, K being a positive integer and smaller than N; and
inserting a predetermined number of blank pixels at a predetermined position of the first initial sub-images, an amount of the blank pixels being equal to a difference between the fourth resolution and the third resolution.

2. The driving method according to claim 1, wherein the first resolution is equal to the second resolution.

3. The driving method according to claim 2, wherein said segmenting the input image into N sub-images comprises:
segmenting the input image into N initial sub-images, the N initial sub-images including K first initial sub-images having a third resolution and (N-K) second initial sub-images having a fourth resolution, the third resolution being smaller than the fourth resolution, K being a positive integer and smaller than N; and
regarding the second initial sub-images as sub-images corresponding to the second initial sub-images, and adding blank pixels to the first initial sub-images to obtain sub-images corresponding to the first initial sub-images, an amount of the blank pixels being equal to a difference between the fourth resolution and the third resolution.

4. The driving method according to claim 3, wherein said converting the YUV signals into RGB signals corresponding to the output image comprises: converting the N groups of YUV signals into N groups of RGB signals;
said converting the RGB signals corresponding to the output image into driving signals for driving the display panel comprises:
converting the N groups of RGB signals into N groups of initial driving signals; and
removing signals corresponding to the blank pixels from the initial driving signals to obtain N groups of driving signals.

5. The driving method according to claim 1, wherein the second resolution is smaller than the first resolution, said converting RGB signals of an input image having a second resolution into YUV signals corresponding to an output image comprises:
converting the RGB signals of the input image into YUV signals corresponding to the input image; and
performing an enlarging process on the YUV signals corresponding to the input image to obtain the YUV signals corresponding to the output image.

6. The driving method according to claim 5, wherein said converting the RGB signals of the input image into YUV signals corresponding to the input image comprises:
segmenting the input image into N initial sub-images, the N initial sub-images including K first initial sub-images having a third resolution and (N-K) second initial sub-images having a fourth resolution, the third resolution being smaller than the fourth resolution, K being a positive integer and smaller than N;
regarding the second initial sub-images as sub-images corresponding to the second initial sub-images, and adding blank pixels to the first initial sub-images to obtain sub-images corresponding to the first initial sub-images, an amount of the blank pixels being equal to a difference between the fourth resolution and the third resolution; and
converting RGB signals of each of the sub-images into a group of YUV signals, to obtain N groups of YUV signals.

7. The driving method according to claim 6, wherein said converting the YUV signals into RGB signals corresponding to the output image comprises:
converting the YUV signals of the sub-images corresponding to the second initial sub-images into corresponding RGB signals; and
converting the YUV signals of the sub-images corresponding to the first initial sub-images into RGB signals and removing RGB signals corresponding to the blank pixels.

8. The driving method according to claim 6, wherein said converting the RGB signals corresponding to the output image into driving signals for driving the display panel comprises:
segmenting the RGB signals corresponding to the output image into M groups, M being a positive integer and equal to or not equal to N; and
converting the M groups of RGB signals into M groups of driving signals.

9. The driving method according to claim 8, wherein among the M groups of RGB signals, J groups of RGB signals correspond to sub-images having a fifth resolution, and (M-J) groups of RGB signals correspond to sub-images having a sixth resolution, the fifth resolution and the sixth resolution are different, J is a positive integer and smaller than M.

10. A driving apparatus for a display panel, the display panel having a first resolution, the driving apparatus comprising a processor and a transmission port, wherein the processor is configured to:
convert RGB signals of an input image having a second resolution into YUV signals corresponding to an output image, a resolution of the output image being not smaller than the second resolution;

convert the YUV signals obtained in the processor into RGB signals corresponding to the output image; and convert the RGB signals obtained in the processor into driving signals for driving the display panel, wherein the transmission port is configured to:

output the driving signals obtained in the processor to the display panel, wherein the processor is configured to convert the RGB signals of the input image into YUV signals corresponding to the output image by:

segmenting the input image into N sub-images, N being a positive integer; and converting RGB signals of each of the sub-images into a group of YUV signals, to obtain N groups of YUV signals, wherein, in a case where the input image cannot be segmented into N sub-images having a same resolution, the segmenting the input image into N sub-images comprises:

segmenting the input image into N initial sub-images, the N initial sub-images including K first initial sub-images having a third resolution and (N-K) second initial sub-images having a fourth resolution, the third resolution being smaller than the fourth resolution, K being a positive integer and smaller than N; and inserting a predetermined number of blank pixels at a predetermined position of the first initial sub-images, an amount of the blank pixels being equal to a difference between the fourth resolution and the third resolution.

11. The driving apparatus according to claim 10, wherein the processor is further configured to convert RGB signals of the input image into YUV signals corresponding to the input image.

12. The driving apparatus according to claim 10, wherein the processor is further configured to enlarge the YUV signals corresponding to the input image to obtain the YUV signals corresponding to the output image.

13. The driving apparatus according to claim 12, wherein the processor is further configured to convert the YUV signals corresponding to the output image into RGB signals corresponding to the output image, and remove RGB signals corresponding to the blank pixels.

14. The driving apparatus according to claim 10, wherein the processor is configured to:

convert the N groups of YUV signals into N groups of RGB signals;

convert the N groups of RGB signals obtained in the processor into N groups of initial driving signals; and remove driving signals corresponding to the blank pixels from among the initial driving signals to obtain N groups of driving signals.

15. The driving apparatus according to claim 14, wherein the processor is further configured to segment the RGB signals outputted by the processor into M groups, and convert the M groups of RGB signals into M groups of driving signals, M being a positive integer and equal to or not equal to N.

16. A display device, comprising a driving apparatus and a display panel, the display panel having a first resolution, an output terminal of the driving apparatus is connected to an input terminal of the display panel, wherein the driving apparatus is the driving apparatus according to claim 10.

17. The display device according to claim 16, wherein the processor is further configured to:

convert the YUV signals corresponding to the output image into RGB signals corresponding to the output image;

remove RGB signals corresponding to the blank pixels;

convert the RGB signals obtained in the processor into initial driving signals; and remove driving signals corresponding to the blank pixels from among the initial driving signals.

* * * * *